Aug. 26, 1969 — F. G. MERSER — 3,462,864

TAG AND ATTACHING MEANS

Filed April 26, 1967

Inventor
Francis G. Merser
by Roberts, Cushman & Grover
Attys

# United States Patent Office 3,462,864
Patented Aug. 26, 1969

3,462,864
TAG AND ATTACHING MEANS
Francis G. Merser, Framingham, Mass., assignor to Dennison Manufacturing Company, Framingham, Mass., a corporation of Nevada
Filed Apr. 26, 1967, Ser. No. 633,783
Int. Cl. G09f 3/08
U.S. Cl. 40—2                                                4 Claims

ABSTRACT OF THE DISCLOSURE

A tag having an opening and a filament of expansible material for attaching the tag to an article, the end of the filament extending through the tag and being expanded to form a head which prevents withdrawal of the filament from the opening.

---

Objects of the invention are to provide tag attaching means which is simple and economical to produce, which holds a tag firmly in position, which is neat and attractive in appearance and from which the tag cannot be detached without tearing the tag or breaking the filament.

This invention involves the combination of a tag and a filament for attaching the tag to an article, the tag having an opening therein and the filament having a portion extending through the opening, said portion comprising deformable material which is expansible to anchor the filament to the tag. Preferably said material is thermoplastic so that said portion may be expanded by heat and pressure to form a head bearing on one side of the tag, said portion comprises a protuberance on one side of the filament so that the filament may extend away from the tag approximately parallel thereto, and the filament has a base for said protuberances bearing on the other side of the tab.

Figure 1:
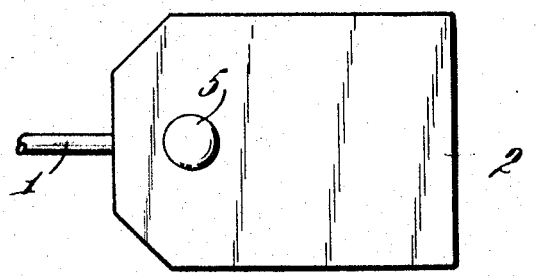
Figure 2:
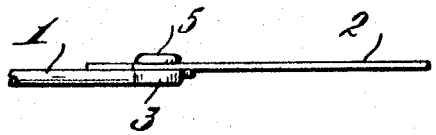
Figure 3:
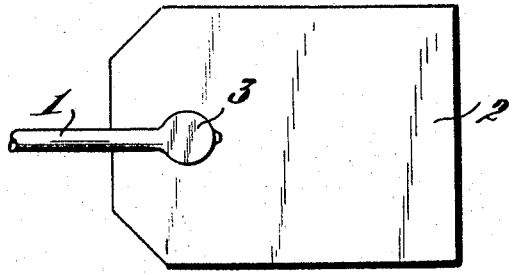
Figure 4:
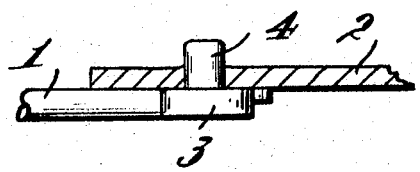

For the purpose of illustration a typical embodiment of the invention is shown in the accompanying drawings in which:

FIG. 1 is a top view;
FIG. 2 is a side view;
FIG. 3 is a bottom view; and
FIG. 4 is a side view showing the method of manufacture.

The particular embodiment of the invention chosen for the purpose of illustration comprises a filament 1 and a tag 2. At one end the filament has an enlargement forming a base 3 which seats against the back of the tag. From the center of the base a protuberance 4 projects through an opening in the tag. The protuberance comprises expansible material which can be flattened to form a head 5 seating against the front of the tag. The protuberance may be tapered upwardly (FIG. 4). The aforesaid material may be nylon or some other thermoplastic material which can be flattened with heat and pressure, and the entire attaching device is preferably formed of a single piece of material as disclosed in my companion Patent 3,402,435, granted Sept. 24, 1968. The attachment 3–5 may also be shaped to serve as a socket as disclosed in said patent.

I claim:
1. The combination of a tag and a filament for attaching the tag to an article, the tag having an opening therein and the filament having a portion extending through the opening, said portion comprising deformable material which is expansible to anchor the filament to the tag, the filament and said portion comprising as integral piece of material which can be swaged over the tag to form a head bearing on the tag around said opening.

2. The combination of claim 1 wherein said material is thermoplastic so that said portion may be expanded by heat and pressure to form a head bearing on one side of the tag.

3. The combination of claim 2 wherein said portion comprises a protuberance on one side of the filament so that the filament may extend away from the tag approximately parallel thereto.

4. The combination of claim 3 wherein the filament has a base for said protuberances bearing on the other side of the tab.

References Cited

UNITED STATES PATENTS

| | | | |
|---|---|---|---|
| 1,495,110 | 5/1924 | Roberts | 40—21 X |
| 3,256,626 | 6/1966 | Stoffel | 40—1.5 |
| 3,257,747 | 6/1966 | Schimmel | 40—1.5 |

FOREIGN PATENTS 84,110    11/1894    Germany.

EUGENE R. CAPOZIO, Primary Examiner
W. J. CONTRERAS, Assistant Examiner